(12) United States Patent
Pigatti et al.

(10) Patent No.: US 11,768,069 B2
(45) Date of Patent: Sep. 26, 2023

(54) DECODING OF ANGLE-CUT KEYS

(71) Applicant: Kaba Ilco Corp., Rocky Mount, NC (US)

(72) Inventors: Giorgio Pigatti, Cordignano (IT); Marco Ceccato, Vittorio Veneto (IT)

(73) Assignee: KABA ILCO CORP, Rocky Mount, NC (US)

( * ) Notice: Subject to any disclaimer, the term of this patent is extended or adjusted under 35 U.S.C. 154(b) by 213 days.

(21) Appl. No.: 17/129,796

(22) Filed: Dec. 21, 2020

(65) Prior Publication Data

US 2022/0196391 A1 Jun. 23, 2022
US 2023/0132395 A9 Apr. 27, 2023

(51) Int. Cl.
*G01B 11/24* (2006.01)
*G01B 11/22* (2006.01)

(52) U.S. Cl.
CPC .............. *G01B 11/24* (2013.01); *G01B 11/22* (2013.01)

(58) Field of Classification Search
CPC .......... G01B 11/22; G01B 11/24; E05B 19/00
See application file for complete search history.

(56) References Cited

U.S. PATENT DOCUMENTS

| | | | |
|---|---|---|---|
| 5,807,042 A * | 9/1998 | Almblad | G06K 9/00 409/83 |
| 6,543,972 B1 * | 4/2003 | Cimino | E05B 19/0011 409/83 |
| 6,687,565 B2 | 2/2004 | Wetterlin et al. | |
| 8,128,322 B2 | 3/2012 | Bass et al. | |
| 8,682,468 B2 | 3/2014 | Marsh et al. | |
| 9,487,968 B2 * | 11/2016 | Gerlings | B23C 3/355 |
| 9,582,734 B2 * | 2/2017 | Thompson | G06V 10/46 |
| 9,669,476 B2 | 6/2017 | Donadini et al. | |
| 10,124,420 B2 | 11/2018 | Spangler et al. | |
| 2016/0114412 A1 | 4/2016 | Bosch | |
| 2016/0377408 A1 * | 12/2016 | Gardner, Jr. | B23C 3/35 356/72 |
| 2020/0222995 A1 | 7/2020 | Jalove | |

* cited by examiner

*Primary Examiner* — Tri T Ton
(74) *Attorney, Agent, or Firm* — Norton Rose Fulbright US LLP

(57) ABSTRACT

Methods, systems, and devices for decoding an angle-cut key are provided. A probe is positioned at a first position relative to the angle-cut key. A first depth reading is performed on the angle-cut key. The probe is displaced to a plurality of subsequent positions and performing a plurality of subsequent depth readings on the angle-cut key. A key map of the angle-cut key is generated based on comparisons performed on a set of depth readings, the set of depth readings comprising the first depth reading and the plurality of subsequent depth readings. A signal indicative of the key map is output.

20 Claims, 7 Drawing Sheets

DECODING OF ANGLE-CUT KEYS

FIELD

The present disclosure relate generally to the field of physical keys.

BACKGROUND

The use of physical keys, in conjunction with physical locks, is widespread in various societies as tools for limiting or granting access to certain locations or certain goods, and keys have been used since antiquity. Keys may be used to lock doors or safes, or may work in association with locks of various types for securing objects of various types.

Modern keys traditionally combine two components, namely a blade portion and a bow portion, with the blade portion being attached to the bow portion. The bow portion is typically wider than the blade portion, and allows a user to hold the key and apply a torque to turn the key in a lock or locking mechanism. The blade portion is typically elongated and may include one or more cuts (also referred to as "bittings") and a tip. The cuts on a key define a map which allows the key to open a lock having a corresponding map. In order to create a copy of a key, either an original is used to replicate the cuts on the blade, or the map must be otherwise obtained.

Improvements are therefore desirable.

SUMMARY

In accordance with one aspect, there is provided a method for decoding an angle-cut key. The method comprises: positioning a probe at a first position relative to the angle-cut key; performing a first depth reading on the angle-cut key; displacing the probe to a plurality of subsequent positions and performing a plurality of subsequent depth readings on the angle-cut key; generating a key map of the angle-cut key based on comparisons performed on a set of depth readings, the set of depth readings comprising the first depth reading and the plurality of subsequent depth readings; and outputting a signal indicative of the key map.

In some embodiments, displacing the probe comprises displacing the probe to the plurality of subsequent positions, each associated with a respective combination of a longitudinal location and a radial orientation relative to the angle-cut key.

In some embodiments, displacing the probe comprises: displacing the probe in sequence to a first subset of the plurality of subsequent positions associated with a corresponding plurality of longitudinal locations and with a first radial orientation; and displacing the probe in sequence to at least one second subset of the plurality of subsequent positions associated with the corresponding plurality of longitudinal locations and with respective second radial orientations.

In some embodiments, generating the key map based on comparisons performed on the set of depth readings comprises: identifying a first cut of the angle-cut key, comprising: obtaining a first subset of the set of depth readings, the first subset associated with a first longitudinal location relative to the angle-cut key and comprising a plurality of depth readings, each of the plurality of depth readings associated with one of a plurality of radial orientations relative to the angle-cut key; comparing the plurality of depth readings to one another to identify at least a first depth of the first cut and an first angle of the first cut based on the deepest depth reading; and storing the first depth and the first angle of the first cut as part of the key map; and identifying at least one subsequent cut of the angle-cut key, comprising: obtaining at least one subsequent subset of the set of depth readings, the at least one subsequent subset associated with at least one respective subsequent longitudinal location relative to the angle-cut key and comprising respective subsequent pluralities of depth readings, each of the depth readings of the subsequent pluralities of depth readings associated with one of the plurality of radial orientations relative to the angle-cut key; comparing, for each of the at least one subsequent subset, the subsequent plurality of depth readings to one another to identify at least a subsequent depth of the at least one subsequent cut and an subsequent angle of the at least one subsequent cut based on subsequent deepest depth readings; and storing the subsequent depth and the subsequent angle of each of the at least one subsequent cut as part of the key map.

In some embodiments, the angle-cut key is a biaxial key, wherein positioning the probe at the first position comprises positioning the probe at a first one of a first pair of positions, the first pair of positions associated with a first longitudinal position relative to the angle cut key, the method comprising, prior to displacing the probe to the plurality of subsequent positions, displacing the probe to a second one of the first pair of positions and performing a second depth reading, and wherein the set of depth readings comprises the second depth reading.

In some embodiments, displacing the probe to the plurality of subsequent positions comprises displacing the probe to a plurality of pairs of subsequent positions, each pair of subsequent positions associated with respective nominal longitudinal positions relative to the angle cut key.

In some embodiments, performing the first depth reading and the plurality of subsequent depth readings comprises detecting breakage of a laser beam emitted by the probe by the angle-cut key.

In some embodiments, performing the first depth reading and the plurality of subsequent depth readings comprises extending the probe toward the angle-cut key to contact different portions of the angle-cut key.

In some embodiments, the method comprises obtaining a request to decode the angle-cut key.

In accordance with another broad aspect, there is provided a system for decoding an angle-cut key. The system comprises a processor and a non-transitory computer-readable medium. The computer-readable medium stores instructions which are executable by the processor for: positioning a probe at a first position relative to the angle-cut key; performing a first depth reading on the angle-cut key; displacing the probe to a plurality of subsequent positions and performing a plurality of subsequent depth readings on the angle-cut key; generating a key map of the angle-cut key based on comparisons performed on a set of depth readings, the set of depth readings comprising the first depth reading and the plurality of subsequent depth readings; and outputting a signal indicative of the key map.

The system of claim 10, wherein displacing the probe comprises displacing the probe to the plurality of subsequent positions, each associated with a respective combination of a longitudinal location and a radial orientation relative to the angle-cut key.

In some embodiments, displacing the probe comprises: displacing the probe in sequence to a first subset of the plurality of subsequent positions associated with a corresponding plurality of longitudinal locations and with a first radial orientation; and displacing the probe in sequence to at least one second subset of the plurality of subsequent positions associated with the corresponding plurality of longitudinal locations and with respective second radial orientations.

In some embodiments, generating the key map based on comparisons performed on the set of depth readings comprises: identifying a first cut of the angle-cut key, comprising: obtaining a first subset of the set of depth readings, the first subset associated with a first longitudinal location relative to the angle-cut key and comprising a plurality of depth readings, each of the plurality of depth readings associated with one of a plurality of radial orientations relative to the angle-cut key; comparing the plurality of depth readings to one another to identify at least a first depth of the first cut and an first angle of the first cut based on the deepest depth reading; and storing the first depth and the first angle of the first cut as part of the key map; and identifying at least one subsequent cut of the angle-cut key, comprising: obtaining at least one subsequent subset of the set of depth readings, the at least one subsequent subset associated with at least one respective subsequent longitudinal location relative to the angle-cut key and comprising respective subsequent pluralities of depth readings, each of the depth readings of the subsequent pluralities of depth readings associated with one of the plurality of radial orientations relative to the angle-cut key; comparing, for each of the at least one subsequent subset, the subsequent plurality of depth readings to one another to identify at least a subsequent depth of the at least one subsequent cut and an subsequent angle of the at least one subsequent cut based on subsequent deepest depth readings; and storing the subsequent depth and the subsequent angle of each of the at least one subsequent cut as part of the key map.

In some embodiments, the angle-cut key is a biaxial key, wherein positioning the probe at the first position comprises positioning the probe at a first one of a first pair of positions, the first pair of positions associated with a first longitudinal position relative to the angle cut key, wherein the instructions are executable by the processor for, prior to displacing the probe to the plurality of subsequent positions, displacing the probe to a second one of the first pair of positions and performing a second depth reading, and wherein the set of depth readings comprises the second depth reading.

In some embodiments, displacing the probe to the plurality of subsequent positions comprises displacing the probe to a plurality of pairs of subsequent positions, each pair of subsequent positions associated with respective longitudinal positions relative to the angle cut key.

In some embodiments, performing the first depth reading and the plurality of subsequent depth readings comprises detecting breakage of a laser beam emitted by the probe by the angle-cut key.

In some embodiments, the instructions are executable by the processor for obtaining a request to decode the angle-cut key.

In accordance with a further broad aspect, there is provided a machine for decoding an angle-cut key. The machine comprises: a key retention mechanism for removably securing and positioning the angle-cut key; a laser probe configured for sensing the shape of at least one cut of the angle-cut key; a carriage mechanically coupled to the probe for displacing the probe to a plurality of positions relative to the angle-cut key; and a control system communicatively coupled to the key retention mechanism, to the carriage, and to the probe for: positioning the probe at a first position relative to the angle-cut key; performing a first depth reading on the angle-cut key by detecting breakage of a laser beam emitted by the laser probe by the angle-cut key; displacing the probe to a plurality of subsequent positions and performing a plurality of subsequent depth readings on the angle-cut key by detecting breakage of the laser beam by the angle-cut key; generating a key map of the angle-cut key based on comparisons performed on a set of depth readings, the set of depth readings comprising the first depth reading and the plurality of subsequent depth readings; and outputting a signal indicative of the key map.

In some embodiments, displacing the probe comprises: displacing the probe in sequence to a first subset of the plurality of subsequent positions associated with a corresponding plurality of longitudinal locations and with a first radial orientation; and displacing the probe in sequence to at least one second subset of the plurality of subsequent positions associated with the corresponding plurality of longitudinal locations and with respective second radial orientations.

In some embodiments, the angle-cut key is a biaxial key, wherein positioning the probe at the first position comprises positioning the probe at a first one of a first pair of positions, the first pair of positions associated with a first longitudinal position relative to the angle cut key, wherein the control system is configured for, prior to displacing the probe to the plurality of subsequent positions, displacing the probe to a second one of the first pair of positions and performing a second depth reading, and wherein the set of depth readings comprises the second depth reading.

Many further features and combinations thereof concerning embodiments described herein will appear to those skilled in the art following a reading of the instant disclosure.

DETAILED DESCRIPTION

Figure 1:
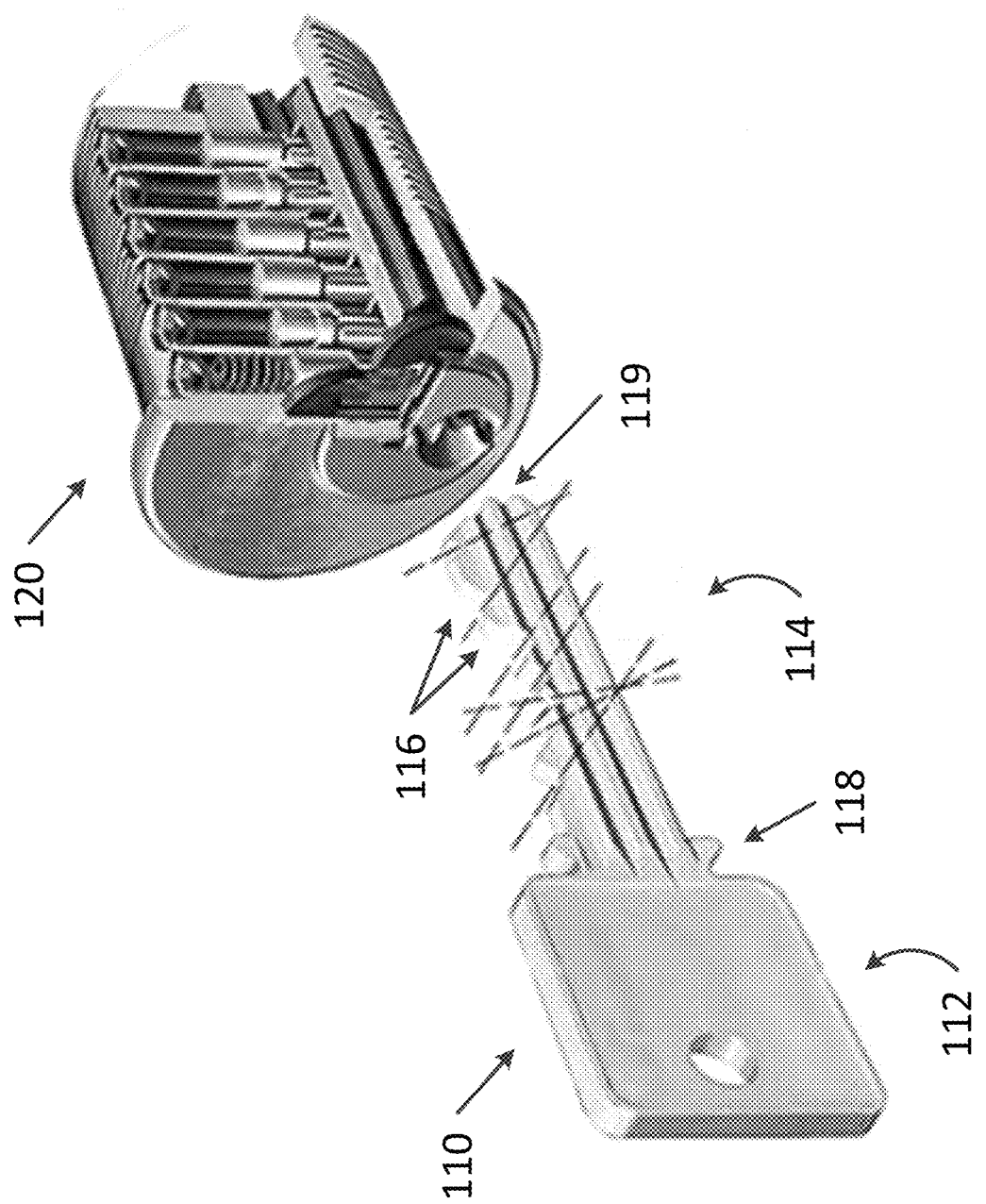
FIG. 1 illustrates an example key and corresponding example lock.

With reference to FIG. 1, there is illustrated an example key 110 and an example lock 120. The key 110 includes a bow portion 112 and a blade portion 114 coupled thereto. The junction between the bow portion 112 and the blade portion 114 defines a shoulder portion 118. The bow portion 112 is generally wider than the blade portion 114, and is the portion held by a user of the key 110 to apply a torque to the key when used in combination with the lock 120. The blade portion 114 is narrow and elongated and defines a tip 119. The blade portion is configured to be cut: in the illustrated example of FIG. 1, the blade portion 114 has defined therein a plurality of cuts 116. The key 110 is insertable into the lock 120, and when the cuts 116 of the blade portion 114 properly match with the mechanisms inside the lock 120, the lock 120 may be unlocked.

The key 110 may be made with any suitable material, including plastics, for example rigid or durable plastics, metal, for example brass, steel, aluminium, and the like, or any other suitable material. While the key 110 is illustrated as having a plurality of cuts 116, it should be noted that in some cases the blade portion 114 may have only one cut 116, or any suitable number of cuts 116. The cuts 116 may be formed within the blade portion 114 in any suitable fashion, including via a milling process, a grinding process, or any other suitable process.

Figure 2A:
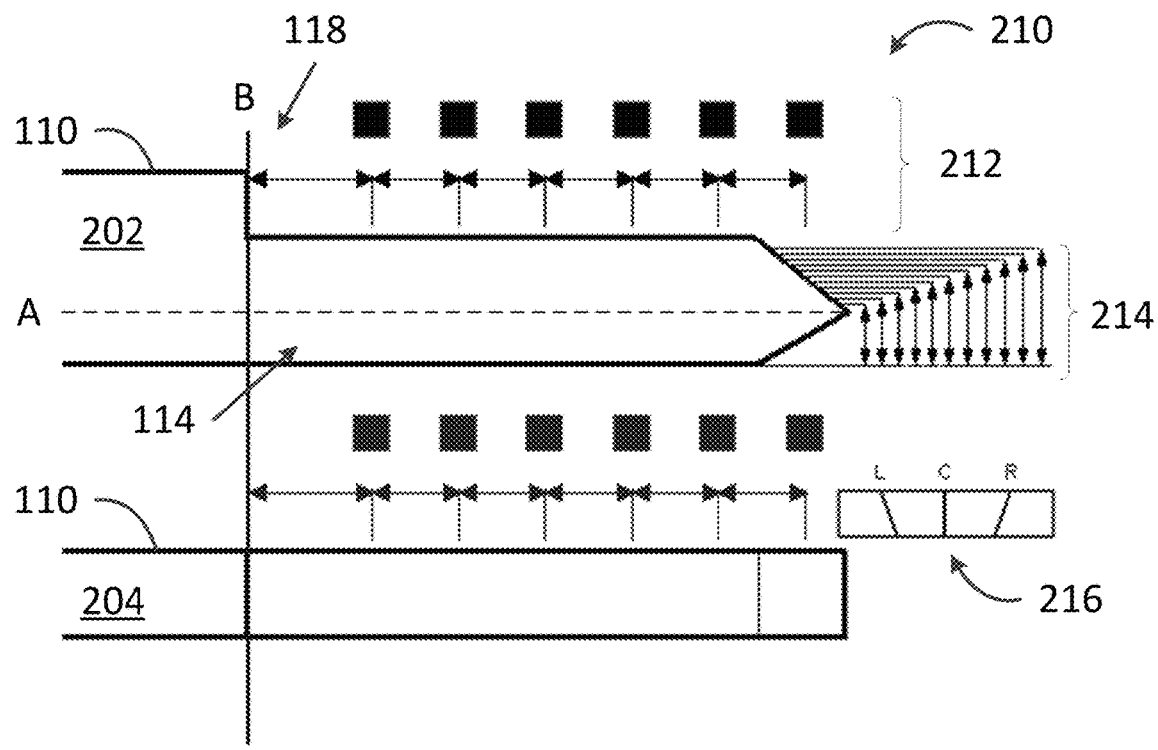
FIGS. 2A-B illustrate example angle-cutting maps for the example key of FIG. 1.
Figure 2B:
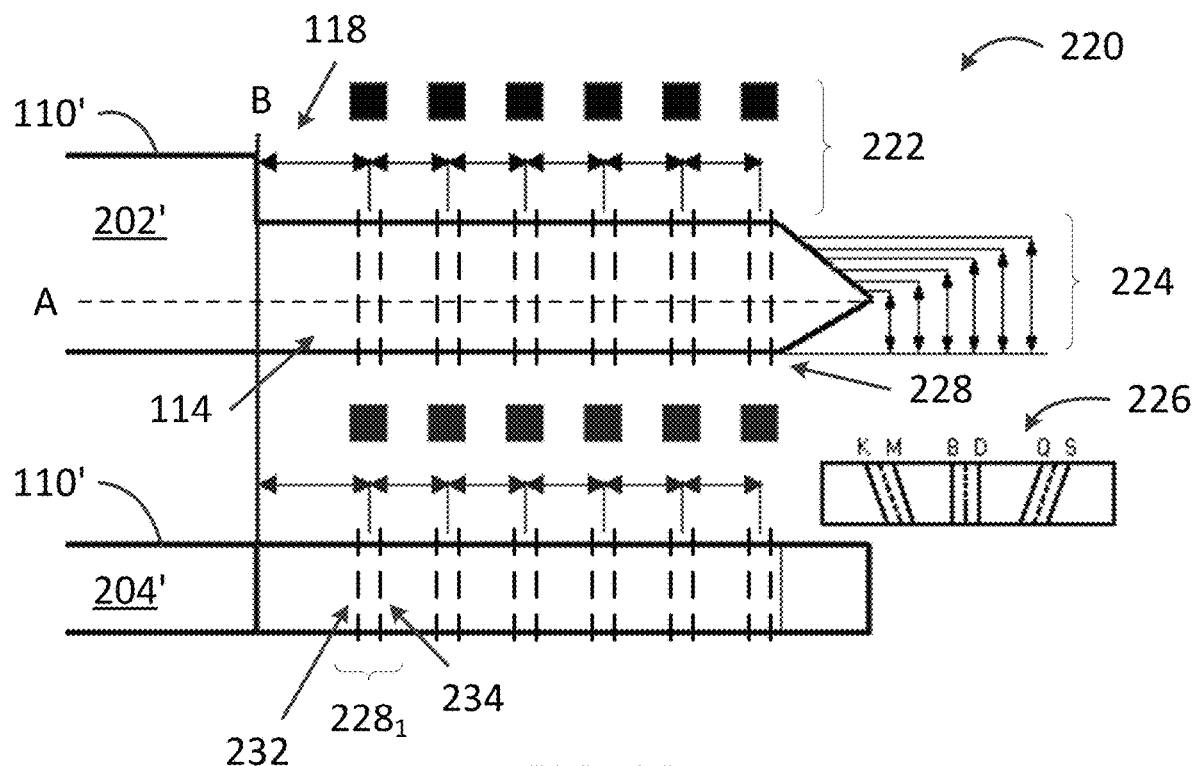

With reference to FIGS. 2A-B, in some embodiments the key 110 is configured to be cut in accordance with a cutting map. A cutting map defines various predetermined values for how the cuts 116 may be formed within the blade portion 114 of the key 110. Two example cutting maps 210 and 220 are illustrated in FIGS. 2A and 2B, respectively, both of which are cutting maps for angle-cut keys. Angle-cut keys are keys for which the cuts 116 are formed by cutting into the blade portion 114 of the key at an angle relative to a top surface of the blade portion 114. It should be noted that cutting maps may be defined for other types of keys, and that the present disclosure may also apply to other types of keys.

In FIG. 2A, the key 110 is illustrated in a side elevational view at 202, and at a top view at 204. The cutting map 210 defines a plurality of longitudinal positions 212 along a longitudinal axis 'A' of the blade portion 114 at which cuts 116 may be formed. The cutting map 210 also defines a plurality of depth values 214 which indicate depths to which the cuts 116 may be formed along a vertical axis 'B'. In some embodiments, each of the cuts 116 formed in the blade portion 114 are of a predetermined, standardized length along the longitudinal axis A. For example, a given cut 116 may descend at a predetermined angle until reaching the associated depth for the cut 116 in question, remain flat for a portion of the standardized length based on the associated depth, and then rise or descend to the depth associated with a subsequent cut 116. In some other embodiments, the length of each of the cuts 116 along the longitudinal axis A is dependent on other characteristics of the cut, for instance a depth of the cut, or the like.

Because the key 110 is an angle-cut key, each of the cuts 116 formed in the blade portion 114 of the key 110 is performed at an angle relative to the top surface of the key 110. To this end, the cutting map 210 additionally defines a plurality of cut angles 216 which indicate angles at which cuts 116 are made. The cut angles 216 are displayed from the perspective of the top surface of the key 110. In the example of FIG. 2A, three cut angles 216 are defined: a centre angle, marked as 'C', a left-angled cut, marked as 'L', and a right-angled cut, marked as 'R'.

In some embodiments, each of the longitudinal positions 212 and the depth values 214 is associated with a particular numerical or alphabetic code: for instance, the six longitudinal positions 212 shown in FIG. 2A are associated with the numerical codes 1 through 6, and the depth values 214 are associated with numerical codes 0 through 10. In conjunction with the 'C', 'L', and 'R' codes defining the cut angles, a series of alphanumeric characters, or similar code, may be used to define the cuts in the key 110 in the form of a key code. A key code may thus be used to copy the key 110 without needing the key 110 itself, or another original on which the key 110 is based. For instance, the code '1 3 C' indicates that the cut 116 in the first longitudinal position 212 is a centre-angle cut of depth 3, and the code '3 7 R' indicates that the cut 116 in the third longitudinal position 212 is a right-angle cut of depth 7. In this fashion, a string of alphanumerical characters may be used to define a key map, which indicates the nature of the cuts 116 in the key 110.

With additional reference to FIG. 2B, in some embodiments, the key 110 may be a particular type of angle-cut key, termed a biaxial key, illustrated here at 110'. A biaxial key is a key in which cuts 116 are made at an offset relative to standard longitudinal positions. In FIG. 2B, the biaxial key 110' is illustrated in a side elevational view at 202', and at a top view at 204'. Similarly to the cutting map 210, the cutting map 220 defines a plurality of longitudinal positions 222 along the longitudinal axis 'A' and a plurality of depth values 224 for forming cuts 116 within the blade portion 114. In the case of the biaxial key 110', for each of the longitudinal positions 222, a pair of cut positions are defined for making cuts 116: a first position which is before the nominal longitudinal position 222 (termed "fore cut position"), and a second which is after the nominal longitudinal position 222 (termed "aft cut position"), relative to the shoulder 118. For example, for the first longitudinal position, illustrated at $228_1$, the fore cut position is illustrated at 232, and the aft cut position is illustrated at 234. It should be noted that the terminology of "fore" and "aft" used in the example of FIG. 2B is one example, and defined relative to the shoulder 118. In other examples, the fore and aft positions may be determined relative to the tip 119 of the key 110'.

The cuts 116 formed within the key 110' may still be angled, and thus the cutting map 220 defines a plurality of cut characteristics 226. The cut characteristics 226 are displayed from the perspective of the top surface of the key 110'. In the example of FIG. 2B, the two cut positions 232 and 234 combine with three cut angles (similarly to the cut angles 216) to define six possible cut characteristics 226: two centre-angled cuts, marked as 'B' and 'D', two left-angled cuts, marked as 'K' and 'M', and two right-angled cuts, marked as 'Q' and 'S', with one of each of the centre, left, and right cuts associated with the fore cut position 232, and the others associated with the aft cut position 234. It should be noted that other types of biaxial cutting maps are also considered, which may involve a different number of longitudinal positions and/or a different number of cut angles.

In some scenarios, it may be desirable to be able to decode a particular key, for instance the key 110 and/or the key 110'. The term "decode" here is used to refer to the process of assessing the cuts 116 of a cut key (which may be an angle-cut key, a biaxial key, or any other suitable type of key) in order to derive a map of the cuts 116 for the key in question. The key map for a particular key defines the nature of the cuts 116 formed within the key, and can serve to produce one or more copies of the key. The present disclosure provides, inter alia, systems, devices, and methods for decoding angle-cut keys, including biaxial keys.

Figure 3:
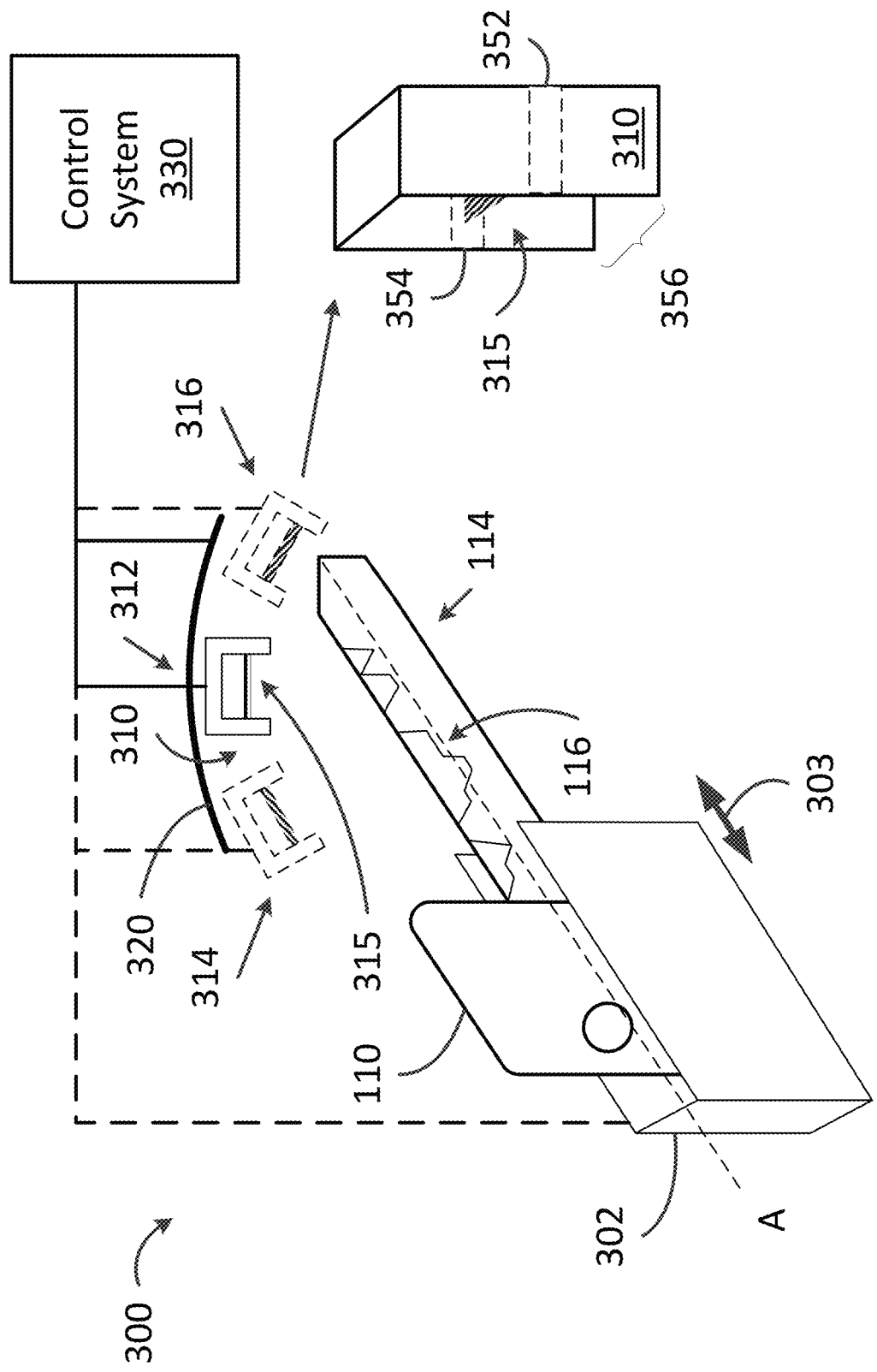
FIG. 3 illustrates a block diagram of an example angle-cut key decoding system.

With reference to FIG. 3, a key decoding system 300 is illustrated. The system 300 includes a retention mechanism 302, a probe 310, a carriage 320, and a control system 330. It should be noted that the elements of the key decoding system 300 may be contained within an enclosure of any suitable type. The retention mechanism 302 is configured for receiving and removably securing a key to be decoded, for instance the key 110. The retention mechanism 302 may include one or more braces, fasteners, spring-loaded elements, or the like, for ensuring that the key 110 is substantially immobile, or controllably mobile, during a decoding process. In some embodiments, the retention mechanism 302 ensures that the key maintains a particular orientation and position throughout the decoding process. In some other embodiments, the retention mechanism 302 is configured to minimize undesirable movement of the key 110 while the key is moved in a predetermined manner or pattern during the decoding process. In some further embodiments, the retention mechanism 302 is movable, or is mounted on a movable device, which causes the key 110 to move to one or more predetermined positions, for instance along a trajectory indicated by the arrow 303.

The probe 310 comprises one or more sensing devices which may be used to sense the shape of the cuts 116 of the key 110. The probe 310 is mechanically coupled to and supported by the carriage 320, which is configured for moving the probe 310 to a plurality of locations relative to the key 110. In some embodiments, the position of the probe 310 relative to the key 110 is also changed via movement of the key 110, for instance using the retention mechanism 302. As a result, the position of the probe 310 relative to the key 110 may be changed by moving the probe 310 itself, by moving the key 110, or by any combination thereof. Thus, the probe 310 can be positioned at various positions relative to the key 110 by any suitable combination of movement of the probe 310 and of movement of the key 110, for instance via the retention mechanism 302.

The probe 310, the carriage 320, and in some cases the retention mechanism 302 are communicatively coupled to control system 330, with the control system 330 configured to effect control of the operation of the probe 310, the carriage 320, and the retention mechanism 302. In some embodiments, the probe 310 is an optical probe which emits light from an emitter 352 and detects the emitted light at a detector 354 which faces the emitter. The behaviour of the light when interacting with the key 110, including with the cuts 116, may be detected by the probe 310. This information may then be used to determine the shape, depth, or other characteristics of the cuts 116.

For example, the probe 310 produces a laser light beam 315 which spans a gap 356 of the probe 310 between the emitter 352 and the detector 354. The probe 310 may be raised or lowered relative to the key 110 to detect a point at which the light beam 315 is broken by the presence of the key 110 within the gap 356 between the emitter 352 and the detector 354. In other words, the probe 310 is moved until the key 110 breaks the line of sight spanned by the light beam 315 between the emitter 352 and detector 354. The detector 354 can produce a particular signal when it no longer detects the light beam 315 produced by the emitter 352, which may be provided to the control system 330. The control system 330 can determine the position (e.g., the depth) of the probe 310 when the light beam 315 is broken, and produce a depth reading based thereon.

In some other embodiments, the probe 310 can detect a degree to which the laser light beam 315 is reflected back toward the probe 310, a degree to which the laser light beam 315 is scattered by the cuts 116, or the like. The probe 310, in conjunction with the control system 330, may use this information to determine one or more characteristics of the cuts 116 and/or of the key 110 generally. For example, the probe 310 can be used to perform measurements of the depth of cuts 116 at a plurality of positions relative to the key 110, which produce a set of depth readings which are then used to decode the key 110.

In some other embodiments, the probe 310 uses a different approach for sensing the cuts 116 of the key 110. For example, the probe 310 includes an extendible or movable mechanical element, for instance a rod, which is displaced to contact the key 110 at a plurality of positions relative to the key 110, which are then used to decode the key 110. The mechanical element may alternatively, or additionally, be a telescoping element, a spring-loaded element, a foldable element, or the like. In another example, the probe 310 includes a magnetic sensing element which uses different electromagnetic signals to sense various characteristics of the key 110.

As noted above, the carriage 320 and/or the retention mechanism 302 is used to position the probe 310 at a variety of different positions relative to the key 110. The carriage 320 may be any suitable type of mechanical implement which supports the probe 310 and causes it to be displaced to the different positions; similarly, the retention mechanism 302 may be, or be coupled to, any suitable mechanical implement which retains the key 110 and assists in moving the key to change the position of the probe 310 relative to the key 110. In the embodiment illustrated in FIG. 3, the probe 310 is illustrated as being located at position 312, and as being movable to positions 314 and 316 via the carriage 320. The positions 314 and 316 are at different radial orientations relative to the top surface of the key 110. For example, the position 312 is at 0° relative to the top surface of the key 110, the position 314 is at 20°, and the position 316 is at −20°. The number of positions at different radial orientations available for the probe 310, and the particular angles at which the probe 310 is movable, may be predetermined based on the type of key 110 being decoded. For instance, the control system 330 may be provided with a request to decode a key. The request may include a brand or type of the key, which in turn informs the control system 330 on which radial orientations should be used for the positions 314, 316. In some embodiments, the probe 310 is also displaceable vertically, such that the probe 310 may be raised or lowered relative to the key 110, in order to perform depth readings of the key 110 (that is to say, to detect the depth of cuts 116 of the key 110), or to determine any other relevant characteristics of the key 110. In some other embodiments, the key 110 may be displaced toward the probe 310 to perform the depth readings of the key 110, for instance via the retention mechanism 302.

Figure 4:
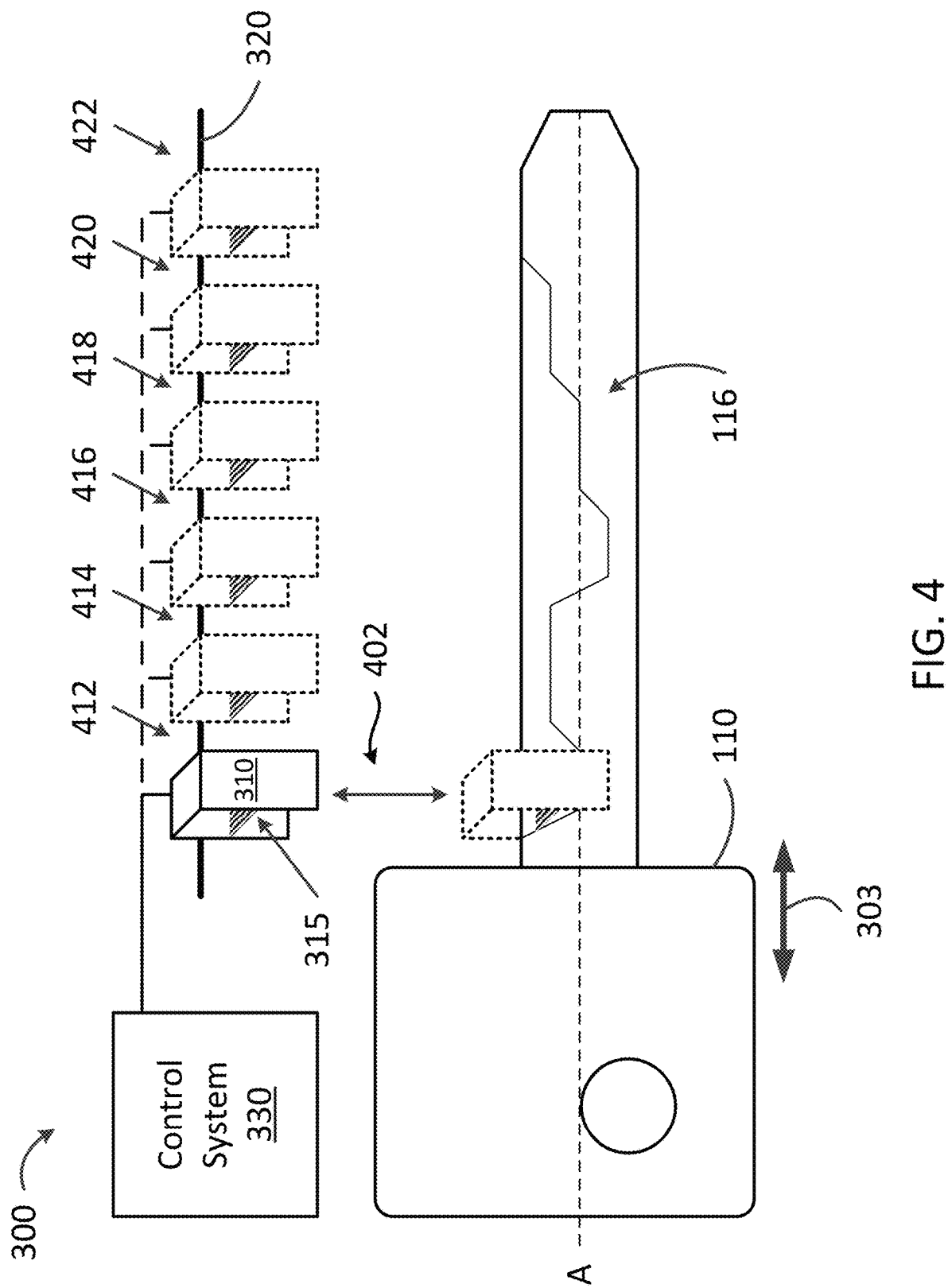
FIG. 4 illustrates a block diagram side view of the example angle-cut key decoding system of FIG. 3.

With additional reference to FIG. 4, the carriage 320 is also configured for moving the probe 310 between a plurality of different longitudinal locations relative to the key 110. In the illustrated example, the probe 310 is positioned at position 412, and is movable to positions 414, 416, 418, 420, and 422 at different longitudinal locations relative to the key 110. The vertical movement of the probe 310 is also illustrated at arrow 402. It should be noted that though the term "vertically" is used in the present disclosure, the movement of the probe 310 may be along any suitable axis, such that the probe 310 is moved toward the key 110 or away therefrom. It should also be noted that that the particular longitudinal locations at which the probe 310 is movable may be predetermined based on the type of key 110 being decoded. The various longitudinal locations relative to the key 110 at which the probe 310 may be positioned may be determined based on the number of longitudinal positions 212 from the cutting map 210 of the key 110. For instance, the position 412 may be associated with a first one of the longitudinal positions 212, and the positions 414-422 are associated with subsequent ones of the longitudinal positions 212. In some other embodiments, the probe 310 may be positioned at a plurality of positions substantially continuously along the longitudinal axis A of the key 110. For a biaxial key, such as the key 110', the number of longitudinal locations relative to the key 110' which may be increased, and may be composed of a number of pairs of longitudinal locations. The first of each pair may be fore of the standard longitudinal location, and the second of each pair may be aft of the standard longitudinal location. Other embodiments are also considered.

The carriage 320 additionally is configured for moving the probe 310 to positions which are combinations of the positions 312, 314, 316 and the positions 412, 414, 416, 418, 420, 422, in which the radial orientations of the positions 312, 314, 316 are combined with the longitudinal locations of the positions 412, 414, 416, 418, 420, 422. For instance, the radial orientation of the position 314 and the longitudinal location of the position 414 are combined to position the probe at the second of the longitudinal positions 212 and at 20° relative to the top surface of the key 110. In this fashion, the probe 310 can sense various characteristics of the key 110 at various radial orientations and longitudinal locations, for instance by being displaced toward or away from the key 110 at various combinations of radial orientations and longitudinal locations.

In some other embodiments, the longitudinal locations of the positions 412, 414, 416, 418, 420, 422 and/or the vertical displacement of the probe 310 may be performed by moving the key 110 itself, for instance via the retention mechanism 302. Thus, the probe 310 may be at a single static position, for instance the position 412, and the key 110 may be movable along the axis indicated by arrow 303 and/or vertically (along the axis indicated by the arrow 402), such that the relative position of the probe 310, with respect to the key 110, corresponds to the remaining positions (414, 416, 418, 420, 422).

In operation, the key decoding system 300 is provided with the key 110 for decoding. A request may be obtained by the control system 330 to decode the key 110, which may identify the brand or type of key, and any other suitable information. The control system 330 determines a number of radial and longitudinal locations at which the probe 310 should be located, and the spacing therebetween. In some embodiments, the control system 330 additionally determines a sequence or pattern of movements for the probe 310 to follow. The control system 330 positions the probe 310, via the carriage 320, at a starting position, which may be predetermined based on the brand or type of key, or may be determined by a current position for the probe 310 when the decoding begins.

The control system 330 operates the probe 310 to obtain one or more measurements relating to one or more characteristics of the key 110 at the various positions. In some embodiments, the probe 310 obtains a depth reading at the starting position, and then moves the probe 310 to one or more subsequent positions at which subsequent depth readings are obtained. The probe 310 may be moved to the subsequent positions in a predetermined order or sequence, for instance based on the starting position, or based on the functionality of the carriage 320. In embodiments in which the probe 310 is an optical probe, depth readings performed by the probe 310 may include a numerical value for a position of depth of the probe 310 at which the laser light beam 315 was broken by the key 110. In embodiments in which the probe 310 operates on a different principle, other approaches may be used to determine the depth readings.

For example, the cutting map 210 for the key 110 defines six (6) longitudinal positions 212 at which cuts 116 may be made. When decoding the key 110, the control system 330 is provided with a brand or type of the key 110, and obtains the cutting map 210 (or a similar set of reference data for the key 110). The control system 330 uses the longitudinal positions 212 for the key 110 to define six (6) longitudinal locations at which the probe 310 is to be positioned when decoding the key 110. Additionally, the control system 330 uses the cut angles 216 of the cutting map 210 to define three (3) radial orientations at which the probe 310 is to be positioned when decoding the key 110. In this fashion, the probe is moved between three radial orientations and six longitudinal locations when decoding the key 110, for a total of 18 depth readings. In some instances, the probe 310 may be positioned at a first radial orientation (e.g. the −20°), and then moved to each of the longitudinal locations in sequence. The probe 310 may then be rotated to different radial orientations and moved through the longitudinal locations in sequence one or more additional times, depending on the number of defined radial orientations. In some other instances, the probe 310 may be rotated through the different radial orientations for a given longitudinal location, and then moved through subsequent longitudinal locations in sequence. Other patterns are also considered.

Figure 5:
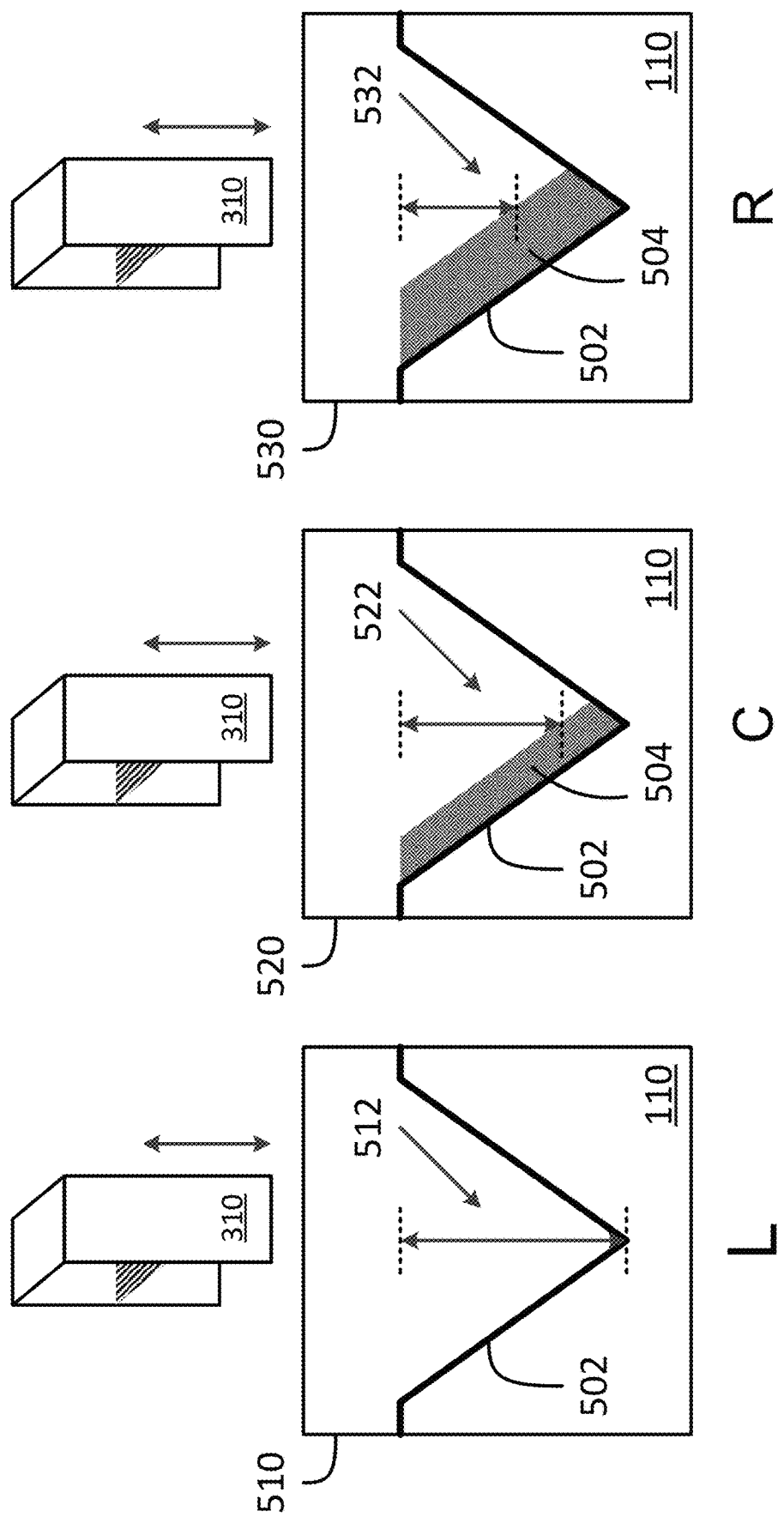
FIG. 5 illustrates example depth readings for an example cut.

With additional reference to FIG. 5, in order to decode the key 110, the depth readings obtained using the probe 310, together forming a set of depth readings, are used to generate the key map for the key 110. Since the key 110 is an angle-cut key, the cuts 116 may be angled relative to the top surface of the key 110. In order to determine the depth and angle of the cuts 116, the depth readings obtained at the different radial orientations for a given longitudinal location are compared to one another. When a cut is angled (the 'L' or 'R' marks of the cut angles 216), the deepest depth reading will be associated with one of the angled positions 314, 316.

In the example of FIG. 5, a left-angled cut 502 is illustrated from three perspectives: the left-angled perspective at 510, the centre perspective at 520, and the right-angled perspective at 530. When a depth reading of the left-angled cut 502 is taken at the left-angled perspective 510, the probe 310 reads to the apex of the left-angled cut 502 before the light beam 315 is broken by the key 110. As a result, the depth reading 512 reads the actual value of the depth of the left-angled cut 502. When the depth reading of the left-angled cut 502 is taken at the centre perspective 520, the probe 310 detects a portion 504 of the cut 502 which is less deep than the apex, due to the angle of the cut 502. Similarly, when the depth reading of the left-angled cut 502 is taken at the right-angled perspective 530, the probe 310 detects the portion 504 at a position less deep than the apex.

In this example, then probe 310 produces three depth readings for the cut 502, one for each of the defined cut angles for the key 110. These depth readings used by the control system 330 to determine the nature of the cut 502. The deepest of the depth values at a given longitudinal position therefore serves to identify both the angle of the cut, and the depth value 214 of the particular cut 116. The evaluation of the depth readings can be repeated for each of the longitudinal positions 212 of the key 110. These values can be used in conjunction with the cutting map 210 in order to decode the key.

For other cuts, the probe 310 will obtain different depth readings. For example, for a particular right-angled cut, the depth reading at the left-angle position will represent a shallower value than the depth reading at the right-angled position, with the center position having a depth reading between the shallower and deeper values. In another instance, when a particular cut 116 is a centered cut, the depth readings at the left- and right-angled positions may be equal, or substantially similar, and the center position depth reading value is deeper than the depth readings at the left- and right-angled positions. Thus, the depth reading at the centre position is the deepest when the particular cut 116 is a centered cut.

In this fashion, the probe 310 is used to obtain a plurality of depth readings at a plurality of positions relative to the key 110. The depth readings for a given longitudinal position 212 are compared across the different radial orientations 312, 314, 316, which serves to identify both the depth value 214 and the cut angle 216 for each of the cuts 116 of the key 110. The relevant comparisons and other calculations may be performed, for instance, by the control system 330, using any suitable approaches.

Figure 6:
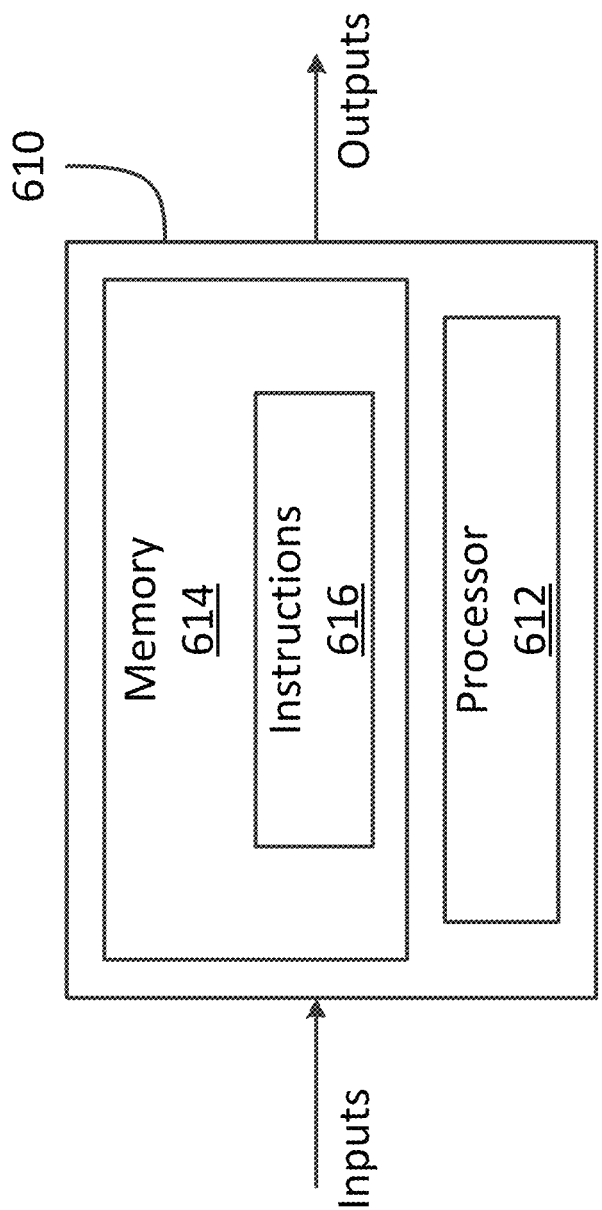
FIG. 6 illustrates a block diagram of an example computer.

With reference to FIG. 6, at least part of certain embodiments of the devices, systems and methods described herein may be implemented in a combination of both hardware and software. For instance, part or all of the control system 330 may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

FIG. 6 is a schematic diagram of an example computing device 610. As depicted, computing device 610 includes at least one processor 612, a memory 614 storing instructions 616, and at least one I/O interface (illustrated as 'Inputs' and 'Outputs'). For simplicity only one computing device 610 is shown but system may include more computing devices 610 operable by users to access remote network resources and exchange data. The computing devices 610 may be the same or different types of devices. The elements of the computing device 610 may be connected in various ways including directly coupled, indirectly coupled via a network, and distributed over a wide geographic area and connected via a network (which may be referred to as "cloud computing").

Each processor 612 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 614 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The I/O interface enables the computing device 610 to interconnect with one or more input devices, such as a keyboard, mouse, camera, touch screen and a microphone, or with one or more output devices such as a display screen and a speaker.

In some embodiments, the computing device 610 includes one or more network interfaces to enable the computing device 610 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Throughout the present disclosure, numerous references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

Various embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

For example, and without limitation, the computing device 610 may be a server, network appliance, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

Figure 7:
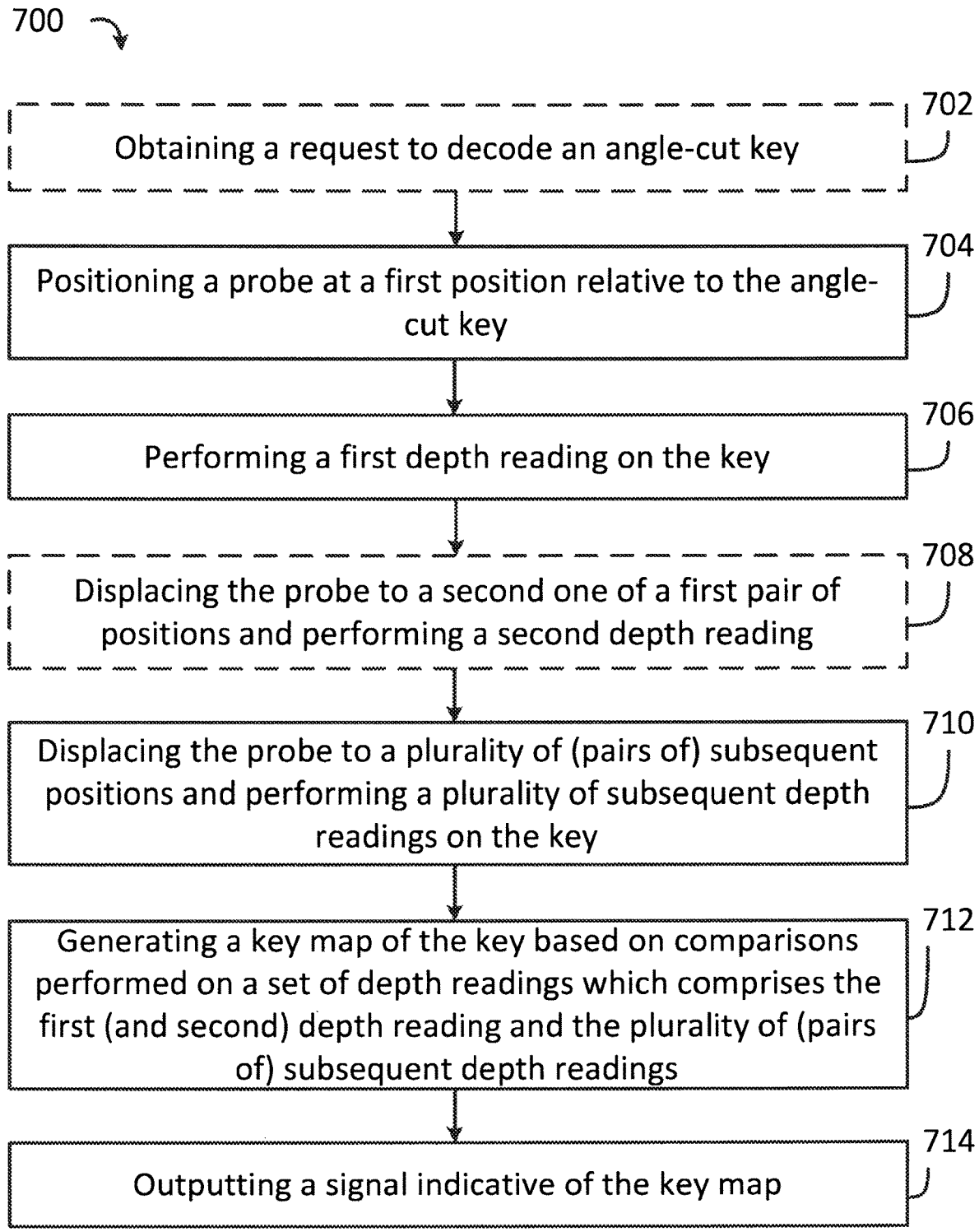
FIG. 7 illustrates an example method of decoding an angle-cut key.

With reference to FIG. 7, an example method 700 for decoding a key, for instance one of the keys 110, 110' is presented. The method 700 may be implemented by the key decoding system 300. It should be noted that although the key decoding system 300 has been described as decoding the key 110, the key decoding system 300 may be configured for decoding any number of types of keys, as appropriate, including the key 110 and the key 110'. The foregoing discussion refers to decoding of key 110', though it should be understood that the method 700 may be performed to decode other types of keys, including the key 110.

At step 702, in some embodiments the method 700 includes obtaining a request to decode an angle-cut key, for instance the key 110'. The request may be provided by an operator via an input, for instance an input associated with the control system 330, or via an external device communicatively coupled to the control system 330. In some embodiments, the request specifies a brand or type of the key 110', and may include a cutting map, or may provide sufficient information for the control system 330 to identify a relevant cutting map based on the request. In some other embodiments, the key decoding system 300 is configured for decoding only one type of key, and may be pre-provided with the relevant cutting map, as appropriate.

At step 704, the method 700 includes positioning a probe at a first position relative to the angle-cut key, for instance the probe 310. The first position may be a predetermined first position based on the type or brand of the key 110', or based on the key decoding system 300 itself. Alternatively, the first position may be determined by the control system 330 based on a current position of the probe 310 at the time when the request is received. The probe 310 may be positioned at the first position via movement of the probe 310 itself, for instance via the carriage 320, and/or via movement of the key 110, for instance via the retention mechanism 302.

At step 706, the method 700 includes performing a first depth reading on the key 110', for instance using the probe 310. The probe 310 may perform the depth reading in a variety of fashions. In some embodiments, the probe 310 includes optical sensing functionality which performs the depth reading using a beam of light, for instance the laser light beam 315. In some other embodiments, the probe 310 includes mechanical sensing functionality via one or more extendible probing elements, magnetic sensing functionality via an electromagnetic wave emitter, or the like. The depth reading may be an indication of the distance travelled by the probe 310 until a portion of the key 110' is detected by the probe 310. Other ways of expressing the depth reading are also considered.

At step 708, in some embodiments the method 700 comprises displacing the probe 310 to a second one of a first pair of positions, and performing a second depth reading. The step 708 may be performed when the key being decoded is a biaxial key, such as the key 110'. The predetermined distance may be defined by the cutting map 220 associated with the key 110', for instance as determined by the control system 330 at step 702, or at any other suitable time.

At step 710, the method 700 comprises displacing the probe 310 to a plurality of subsequent positions and performing a plurality of subsequent depth readings on the key 110'. The subsequent positions may be individual positions, defined as combinations of the radial orientations and longitudinal locations at which cuts 116 of the key 110' may be located. This may be the case when scanning an angle-cut key which is not a biaxial key, such as the key 110. In some other cases, the subsequent positions are pairs of positions fore and aft of longitudinal locations, or at other positions relating thereto, as with the biaxial key 110'. The subsequent positions may be traversed in any suitable sequence, for instance to minimize the overall movement of the probe 310 effected by the carriage 320, or to minimize the amount of time taken to obtain the subsequent depth readings. In one example implementation, the probe 310 is displaced through a plurality of longitudinal locations at a fixed radial orientation. Then, the probe 310 is rotated to a subsequent radial orientation, and is again displaced through the plurality of longitudinal locations. This process may be repeated for one or more additional radial orientations. Rotation of the probe 310 may be performed via the carriage 320, and positioning of the probe at the plurality of longitudinal locations may be performed by movement of the key 110 itself, for instance via the retention mechanism 302. Other approaches are also considered.

At step 712, the method 700 comprises generating a key map of the key 110'. The key map is generated based on comparisons performed on a set of depth readings, which includes the first depth reading obtained at step 706, in some embodiments the second depth reading obtained at step 708, and the subsequent depth readings obtained at step 710. Generating the key map may involve comparing the depth readings associated with particular longitudinal locations of the key 110' to identify the deepest reading. The deepest reading is indicative of the angle of the cut, the depth of the cut, and, in the case of biaxial keys, of which of the pairs of longitudinal positions the cut is located at.

At step 714, the method 700 comprises outputting a signal indicative of the key map. The signal may be any suitable sort of signal which comprises a representation of the key map. For example, the key map may be represented as a string composed of alphanumeric characters. The signal may include the string itself, or the string in association with various metadata. For instance, the request received at step 702 may include various information about the key 110' which was decoded, and some or all of this information may be included as metadata with the string as part of the signal output at step 714. In another instance, the metadata may include a time at which the decoding was performed, any error signals produced during the decoding, or the like.

The signal may be output to a screen or other display device associated with the control system 330. Alternatively, or in addition, the signal may be output to a printer or other physical media production device which produces a physical representation of the key map. In some other embodiments, the signal may be stored in a database or memory for later use or retrieval. For instance, the signal may be provided to a key cutting machine for producing one or more copies of the key 110'. In some embodiments, the key decoding system 300 is also configured for producing keys. As a result, the key decoding system 300 may first decode a particular key, for instance the key 110', and then be instructed to produce one or more copies of the key 110'. To this end, the key decoding system 300 may be provided with various key milling or cutting implements, or be provided as part of a larger key production system. In some embodiments, the key map for a decoded key may be compared to key maps of other keys, for instance to identify a key cutting defect, or to determine whether a copy is genuine or not.

The present disclosure provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used. The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope as defined by the appended claims. It should be understood that the examples described above and illustrated herein are intended to be examples only.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for decoding an angle-cut key, comprising:
    positioning a probe at a first position relative to the angle-cut key corresponding to a first cut of the angle-cut key;
    performing a first depth reading on the angle-cut key;
    displacing the probe to a plurality of subsequent positions corresponding to at least one subsequent cut of the angle-cut key and performing a plurality of subsequent depth readings on the angle-cut key, wherein each plurality of subsequent positions is associated with a respective combination of a longitudinal location and a radial orientation relative to the angle-cut key;
    generating a key map of the angle-cut key based on comparisons performed on a set of depth readings, the set of depth readings comprising the first depth reading and the plurality of subsequent depth readings; and
    outputting a signal indicative of the key map;
    wherein generating the key map based on comparisons performed on the set of depth readings comprises:
        identifying the first cut of the angle-cut key, comprising:
            obtaining a first subset of the set of depth readings, the first subset associated with a first longitudinal location relative to the angle-cut key and comprising a plurality of depth readings, each of the plurality of depth readings associated with one of a plurality of radial orientations relative to the angle-cut key;
            comparing the plurality of depth readings to one another to identify at least a first depth of the first cut and a first angle of the first cut based on the deepest depth reading; and
            storing the first depth and the first angle of the first cut as part of the key map; and
        identifying the at least one subsequent cut of the angle-cut key, comprising:
            obtaining at least one subsequent subset of the set of depth readings, the at least one subsequent subset associated with at least one respective subsequent longitudinal location relative to the angle-cut key and comprising respective subsequent pluralities of depth readings, each of the depth readings of the subsequent pluralities of depth readings associated with one of the plurality of radial orientations relative to the angle-cut key;
            comparing, for each of the at least one subsequent subset, the subsequent plurality of depth readings to one another to identify at least a subsequent depth of the at least one subsequent cut and a subsequent angle of the at least one subsequent cut based on subsequent deepest depth readings; and
            storing the subsequent depth and the subsequent angle of each of the at least one subsequent cut as part of the key map.

2. The method of claim 1, wherein displacing the probe comprises:
    displacing the probe in sequence to a first subset of the plurality of subsequent positions associated with a corresponding plurality of longitudinal locations and with a first radial orientation; and
    displacing the probe in sequence to at least one second subset of the plurality of subsequent positions associated with the corresponding plurality of longitudinal locations and with respective second radial orientations.

3. The method of claim 1, wherein performing the first depth reading and the plurality of subsequent depth readings comprises detecting breakage of a laser beam emitted by the probe by the angle-cut key.

4. The method of claim 1, wherein performing the first depth reading and the plurality of subsequent depth readings comprises extending the probe toward the angle-cut key to contact different portions of the angle-cut key.

5. The method of claim 1, comprising obtaining a request to decode the angle-cut key.

6. A system for decoding an angle-cut key, comprising:
    a processor; and
    a non-transitory computer-readable medium having stored thereon instructions executable by the processor for:
        positioning a probe at a first position relative to the angle-cut key corresponding to a first cut of the angle-cut key;
        performing a first depth reading on the angle-cut key;
        displacing the probe to a plurality of subsequent positions corresponding to at least one subsequent cut of the angle-cut key and performing a plurality of subsequent depth readings on the angle-cut key, wherein each subsequent position of the plurality of subsequent positions is associated with a respective combination of a longitudinal location and a radial orientation relative to the angle-cut key;
        generating a key map of the angle-cut key based on comparisons performed on a set of depth readings, the set of depth readings comprising the first depth reading and the plurality of subsequent depth readings; and
        outputting a signal indicative of the key map;
        wherein generating the key map based on comparisons performed on the set of depth readings comprises:
            identifying the first cut of the angle-cut key, comprising:
                obtaining a first subset of the set of depth readings, the first subset associated with a first longitudinal location relative to the angle-cut key and comprising a plurality of depth readings, each of the plurality of depth readings associated with one of a plurality of radial orientations relative to the angle-cut key;

comparing the plurality of depth readings to one another to identify at least a first depth of the first cut and a first angle of the first cut based on the deepest depth reading; and storing the first depth and the first angle of the first cut as part of the key map; and identifying the at least one subsequent cut of the angle-cut key, comprising:

obtaining at least one subsequent subset of the set of depth readings, the at least one subsequent subset associated with at least one respective subsequent longitudinal location relative to the angle-cut key and comprising respective subsequent pluralities of depth readings, each of the depth readings of the subsequent pluralities of depth readings associated with one of the plurality of radial orientations relative to the angle-cut key;

comparing, for each of the at least one subsequent subset, the subsequent plurality of depth readings to one another to identify at least a subsequent depth of the at least one subsequent cut and a subsequent angle of the at least one subsequent cut based on subsequent deepest depth readings; and storing the subsequent depth and the subsequent angle of each of the at least one subsequent cut as part of the key map.

7. The system of claim 6, wherein displacing the probe comprises:

displacing the probe in sequence to a first subset of the plurality of subsequent positions associated with a corresponding plurality of longitudinal locations and with a first radial orientation; and displacing the probe in sequence to at least one second subset of the plurality of subsequent positions associated with the corresponding plurality of longitudinal locations and with respective second radial orientations.

8. The system of claim 6, wherein performing the first depth reading and the plurality of subsequent depth readings comprises detecting breakage of a laser beam emitted by the probe by the angle-cut key.

9. The system of claim 6, wherein the instructions are executable by the processor for obtaining a request to decode the angle-cut key.

10. A machine for decoding an angle-cut key, comprising:
a key retention mechanism for removably securing and positioning the angle-cut key;
a laser probe configured for sensing a shape of at least one cut of the angle-cut key;
a carriage mechanically coupled to the probe for displacing the probe to a plurality of positions relative to the angle-cut key; and
a control system communicatively coupled to the key retention mechanism, to the carriage, and to the probe for:

positioning the probe at a first position relative to the angle-cut key corresponding to a first cut of the angle-cut key;

performing a first depth reading on the angle-cut key by detecting breakage of a laser beam emitted by the laser probe by the angle-cut key;

displacing the probe to a plurality of subsequent positions corresponding to at least one subsequent cut of the angle-cut key and performing a plurality of subsequent depth readings on the angle-cut key by detecting breakage of the laser beam by the angle-cut key;

generating a key map of the angle-cut key based on comparisons performed on a set of depth readings, the set of depth readings comprising the first depth reading and the plurality of subsequent depth readings; and outputting a signal indicative of the key map, wherein the angle-cut key is a biaxial key, wherein positioning the probe at the first position comprises positioning the probe at a first one of a first pair of positions, the first pair of positions associated with a first longitudinal position relative to the angle-cut key, wherein the control system is configured for, prior to displacing the probe to the plurality of subsequent positions, displacing the probe to a second one of the first pair of positions and performing a second depth reading, and wherein the set of depth readings comprises the second depth reading.

11. The machine of claim 10, wherein displacing the probe comprises:

displacing the probe in sequence to a first subset of the plurality of subsequent positions associated with a corresponding plurality of longitudinal locations and with a first radial orientation; and displacing the probe in sequence to at least one second subset of the plurality of subsequent positions associated with the corresponding plurality of longitudinal locations and with respective second radial orientations.

12. A method for decoding an angle-cut key, comprising:
positioning a probe at a first position relative to the angle-cut key corresponding to a first cut of the angle-cut key;

performing a first depth reading on the angle-cut key;

displacing the probe to a plurality of subsequent positions corresponding to at least one subsequent cut of the angle-cut key and performing a plurality of subsequent depth readings on the angle-cut key;

generating a key map of the angle-cut key based on comparisons performed on a set of depth readings, the set of depth readings comprising the first depth reading and the plurality of subsequent depth readings; and outputting a signal indicative of the key map;

wherein the angle-cut key is a biaxial key, wherein positioning the probe at the first position comprises positioning the probe at a first one of a first pair of positions, the first pair of positions associated with a first longitudinal position relative to the angle-cut key, the method comprising, prior to displacing the probe to the plurality of subsequent positions, displacing the probe to a second one of the first pair of positions and performing a second depth reading, and wherein the set of depth readings comprises the second depth reading.

13. The method of claim 12, wherein performing the first depth reading and the plurality of subsequent depth readings comprises detecting breakage of a laser beam emitted by the probe by the angle-cut key.

14. The method of claim 12, wherein performing the first depth reading and the plurality of subsequent depth readings comprises extending the probe toward the angle-cut key to contact different portions of the angle-cut key.

15. The method of claim 12, comprising obtaining a request to decode the angle-cut key.

16. The method of claim 12, wherein displacing the probe to the plurality of subsequent positions comprises displacing the probe to a plurality of pairs of subsequent positions, each pair of subsequent positions associated with respective nominal longitudinal positions relative to the angle-cut key.

17. A system for decoding an angle-cut key, comprising:
a processor; and
a non-transitory computer-readable medium having stored thereon instructions executable by the processor for:
positioning a probe at a first position relative to the angle-cut key corresponding to a first cut of the angle-cut key;
performing a first depth reading on the angle-cut key;
displacing the probe to a plurality of subsequent positions corresponding to at least one subsequent cut of the angle-cut key and performing a plurality of subsequent depth readings on the angle-cut key;
generating a key map of the angle-cut key based on comparisons performed on a set of depth readings, the set of depth readings comprising the first depth reading and the plurality of subsequent depth readings; and
outputting a signal indicative of the key map;
wherein the angle-cut key is a biaxial key, wherein positioning the probe at the first position comprises positioning the probe at a first one of a first pair of positions, the first pair of positions associated with a first longitudinal position relative to the angle-cut key, wherein the instructions are executable by the processor for, prior to displacing the probe to the plurality of subsequent positions, displacing the probe to a second one of the first pair of positions and performing a second depth reading; and wherein the set of depth readings comprises the second depth reading.

18. The system of claim 17, wherein performing the first depth reading and the plurality of subsequent depth readings comprises detecting breakage of a laser beam emitted by the probe by the angle-cut key.

19. The system of claim 17, wherein the instructions are executable by the processor for obtaining a request to decode the angle-cut key.

20. The system of claim 17, wherein displacing the probe to the plurality of subsequent positions comprises displacing the probe to a plurality of pairs of subsequent positions, each pair of subsequent positions associated with respective longitudinal positions relative to the angle-cut key.

* * * * *